(No Model.) 2 Sheets—Sheet 1.

H. ALBRECHT & J. R. BITNER.
BALING PRESS.

No. 588,938. Patented Aug. 31, 1897.

Witnesses.
Inventors.
Hermann Albrecht
John R. Bitner
By their attorney (No Model.) 2 Sheets—Sheet 2.
H. ALBRECHT & J. R. BITNER.
BALING PRESS.
No. 588,938. Patented Aug. 31, 1897.
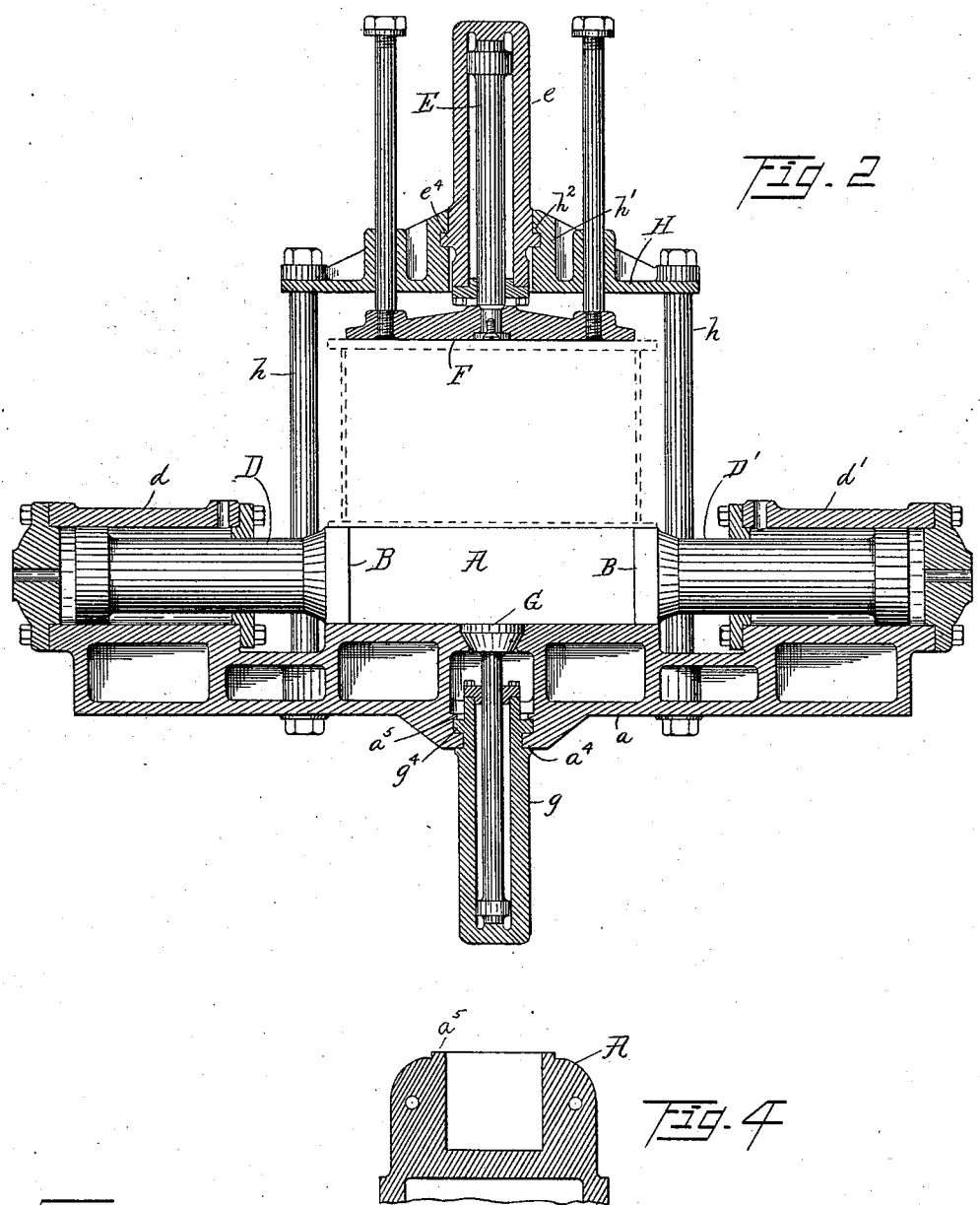
Witnesses.
Inventors.
Hermann Albrecht
John R. Bitner
By their attorney

UNITED STATES PATENT OFFICE.

HERMANN ALBRECHT AND JOHN R. BITNER, OF CLEVELAND, OHIO, ASSIGNORS TO THE JOHNSTON & JENNINGS COMPANY, OF SAME PLACE.

BALING-PRESS.

SPECIFICATION forming part of Letters Patent No. 588,938, dated August 31, 1897.

Application filed February 19, 1896. Serial No. 579,981. (No model.)

*To all whom it may concern:*

Be it known that we, HERMANN ALBRECHT and JOHN R. BITNER, citizens of the United States, residing at Cleveland, in the county of Cuyahoga and State of Ohio, have invented certain new and useful Improvements in Baling-Presses; and we do hereby declare the following to be a full, clear, and exact description of the invention, such as will enable others skilled in the art to which it appertains to make and use the same.

The object of our invention is to provide a baling-press in which loose balable material, and especially metal scrap, such as is produced in metal-stamping works, may be pressed into a compact bale or ingot. The mechanism is especially contrived with a view to making the press strong and durable, and to producing the desired result quickly and with the least possible movement of the compressing mechanism.

The invention consists in the construction and combination of parts hereinafter described and claimed.

Figure 1:
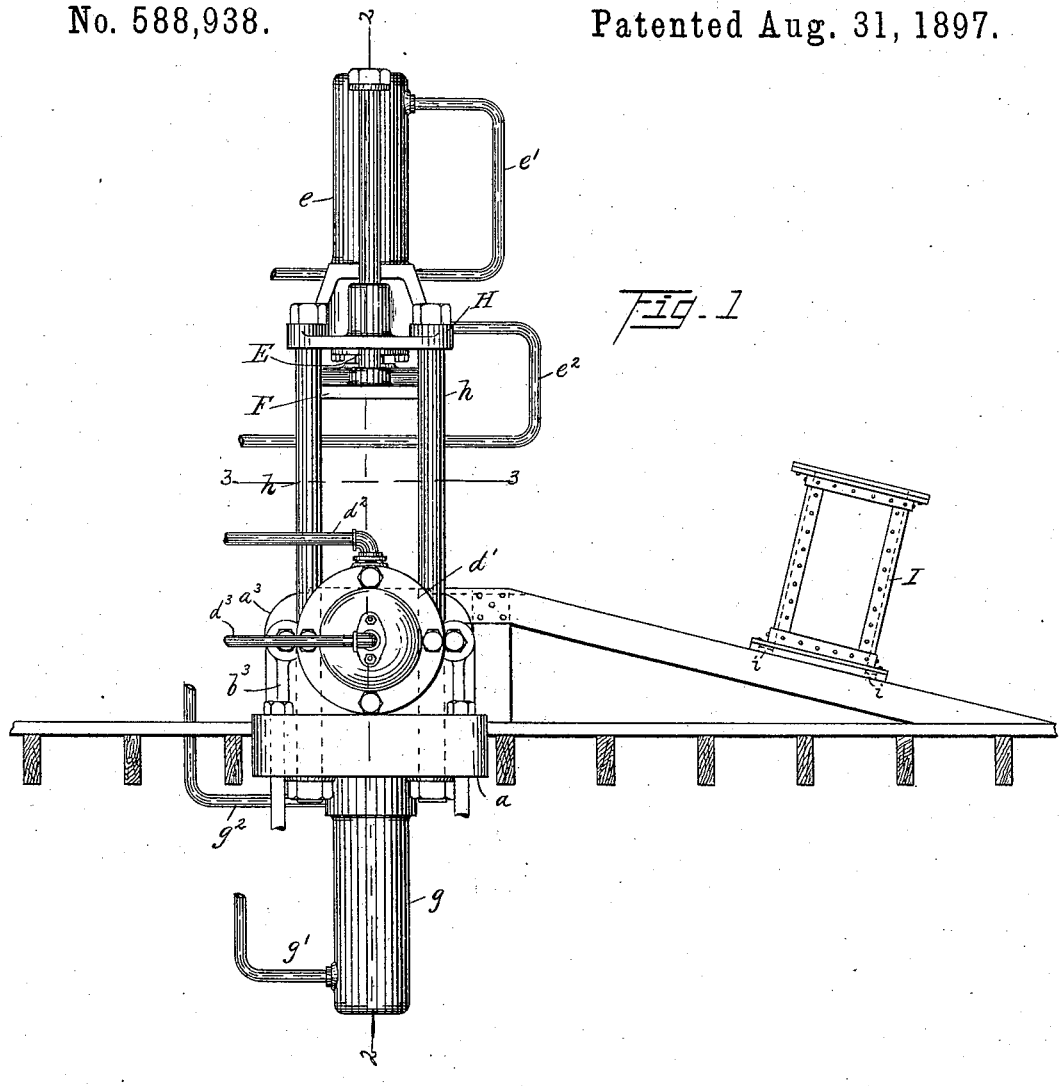
Figure 3:
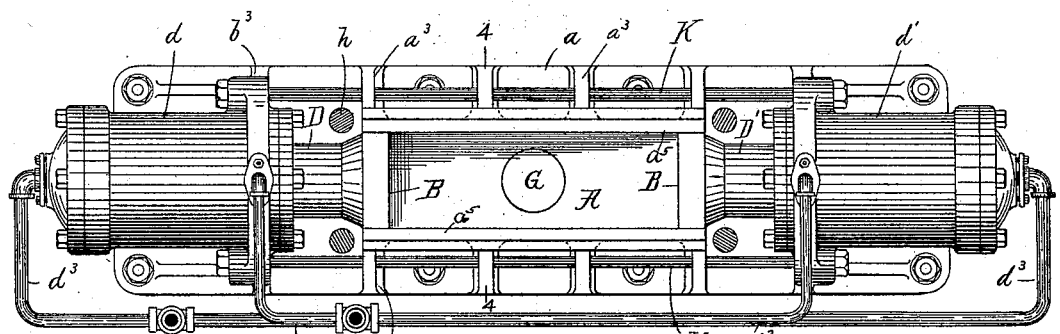

In the drawings, Figure 1 is a side elevation of the press in its best form. Fig. 2 is a vertical sectional view on line 2 2 of Fig. 1. Fig. 3 is a sectional plan view on line 3 3 of Fig. 1. Fig. 4 is a transverse section of the trough on line 4 4 of Fig. 3.

Referring now to the parts by letters, A represents a trough having front and rear sides only, which rise from the bed-plate of the machine.

B B represent two compression-plates which fit in the trough and form the ends thereof. These plates are movable in the trough toward and from each other for the purpose of compressing the material confined between them in the trough. In the machine as shown in the drawings these plates are secured to the ends of the hydraulic rams D D', which are movable in the cylinders $d$ $d'$. These cylinders are mounted on the bed of the machine at the ends of the trough. Two pipes $d^2$ $d^3$ are connected to opposite ends of each cylinder, and these pipes are brought together at a suitable point, and a valve or valves are provided whereby both pipes $d^2$ may be connected at the same time with the pressure-pipe and the two other pipes $d^3$ with the exhaust, and vice versa. It is not thought necessary to make any specific showing of the valves or the main pressure-pipe or exhaust-pipe. There is nothing new about these specific parts of the device, and any suitable construction and arrangement of such parts well known in the art may be adopted.

The top of the trough is closed during the compressing operation by a cover-plate F. Any suitable cover-plate is included in the invention as broadly claimed, provided it may be removed so as to permit the material to be baled to be placed in the trough, and suitable mechanism is provided for holding it closed when the trough has been charged. The particular construction illustrated has, however, certain advantages over any other, as will appear in the subsequent description. In the construction shown this plate is on the lower end of a hydraulic ram E, which is movable in the vertical cylinder $e$. This cylinder may be supported in the necessary relation to the trough in any suitable manner. As shown, it is secured to the plate H, which is supported upon the four posts $h$, which rise from the bed $a$. The pipes $e'$ $e^2$ connect the upper and lower ends, respectively, of this cylinder with the pressure-pipe and exhaust, a suitable valve being provided for making the desired connection.

An ejector-plunger G passes through the bottom of the trough. It is movable in a hydraulic cylinder $g$, which is fixed beneath the bed-plate. This cylinder, like the others, is connected at opposite ends with the pressure-pipe and exhaust by the pipes $g'$ $g^2$, and a suitable valve is provided for making the desired connection.

In operating the described mechanism the material to be baled may be charged directly into the trough when the cover is lifted; but when this mode of operation is adopted it is necessary for workmen to pack the material down as hard as possible before the cover is closed. This takes time and adds to the cost, and, moreover, it is impossible to get as much material into the trough for compression as by the preferred mode of operation, as follows: A box I, two or three times as deep as the trough, having neither top nor bottom, rests upon the floor or a platform adjacent to the machine. The interior dimensions (length and width) of the box are substantially the same as those of the trough when the compression-plates B B are retracted, and only so much larger than the cover-plate F as will permit this cover-plate to move up and down through said box. The top edge of the trough is set at the level of the floor or platform in order that the operation to be described may be conducted most effectively. In the drawings the platform is shown to be inclined from the floor-level to the level of the top of the trough.

The mode of operation is substantially as follows: As much material as it is desired to compress is placed in the box I, the floor serving as the bottom of the box. The box is then slid along the floor until it is directly over the trough and under the cover-plate. To facilitate the accurate placing of this box, the top edges of the trough and bottom of the box may be provided with tongues $a^5$ and grooves $i$, adapted to engage with each other. When the box has been placed as described, the cover-plate is caused to move down and it pushes the material out of the box and into the trough, compressing it to about one-half to one-third of its bulk, more or less. Then both plates B B are caused to move simultaneously toward each other, thereby still further compressing said material between them. The cover-plate F is caused to remain down during this compressing operation. The amount of compression is of course dependent upon the extent of the movement of the plates B B, and this may be controlled by the valve provided for the purpose; but in the construction shown there is little likelihood of anything breaking, even if the movement of the plates toward each other is not checked, because the hydraulic pressure on one plate-moving ram is equal to the pressure on the other ram, and when the material has been compressed as much as possible with the hydraulic pressure employed the movement of the two plates ceases. Another advantage of using two inversely-moving pressure-plates is that the desired result is effected more quickly, with less friction, and with less strain upon the mechanism. After the bale has been formed the pressure-plates B B are retracted, the cover-plate is lifted, the box is removed, and the bale is ejected by the ejector-plunger G. Another box I has been filled in the meantime and is ready, without loss of time, to be placed in position for another similar operation.

We will now explain certain specific features of construction which, while of considerable practical value and utility, are not material to the broad invention. On the sides of the trough and of the cylinders are the flange-ribs $a^3$ $b^3$, and through these ribs pass the tie-rods K, by means of which the described parts are braced and held in the described relation to each other.

At or near the lower edge of the cylinder $e$ is a mutilated external flange $e^4$, and the socket $h'$ in plate H, which receives the end of the cylinder, is provided on its upper edge with a mutilated internal flange $h^2$. The lower end of the cylinder $e$ is inserted in the socket $h'$ in the plate H and then turned upon its axis, thereby causing the flanges $h^2$ and $e^4$ to interlock, and thus prevent the removal of the cylinder when in the described position. A similar mutilated flange $g^4$ is formed upon the upper end of the cylinder $g$, and it interlocks in like manner with a mutilated flange $a^4$ on the bed $a$, surrounding the socket $a^5$, which receives the end of said cylinder.

The described construction makes an effective operative connection, but permits the easy removal of either or both cylinders.

Having described our invention, we claim—

1. In a baling-press, in combination, a compression-trough, two movable plates in said trough, mechanism for moving said plates toward and from each other, a box open at top and bottom and adapted to be placed upon said trough, a cover-plate normally held above the top of said box, mechanism for moving it down through said box to the top of said trough, substantially as and for the purpose specified.

2. In a baling-press, in combination, a compression-trough, two movable plates in said trough, mechanism for moving said plates toward and from each other, a box open at top and bottom and adapted to be placed upon said trough, a cover-plate normally held above the top of said box, mechanism for moving it down through said box to the top of said trough, and a vertically-movable ejector-plunger which forms a part of the bottom of the trough during the compression operation, substantially as and for the purpose specified.

3. In a baling-press, in combination, a hydraulic cylinder having an external mutilated flange near one end, a plate having a socket adapted to receive said end of the cylinder, a mutilated flange on said plate projecting into said socket and adapted to engage with the mutilated flange on the cylinder, substantially as and for the purpose specified.

4. In a baling-press, in combination, a compression-trough having on the under side of its bottom plate a socket surrounded by an internal mutilated flange, a hydraulic cylinder having on its upper end an external mutilated flange which engages with the flange on the bottom of the trough, substantially as and for the purpose specified.

5. In a baling-press, the combination of a compression-trough, a platform adjacent to and at the level of the top of the trough, two movable plates which lie and fit in said trough, mechanism for moving said plates toward and from each other, a box open at top and bottom adapted to slide upon said platform toward and onto the trough, a cover-plate normally held above the box when it is resting upon said trough, and mechanism for moving it down through said box to the top of said trough, substantially as and for the purpose specified.

In testimony whereof we affix our signatures in presence of two witnesses.

HERMANN ALBRECHT.
JNO. R. BITNER.

Witnesses:
E. L. THURSTON,
L. F. GRISWOLD.